United States Patent
Takada et al.

(10) Patent No.: US 6,440,599 B1
(45) Date of Patent: Aug. 27, 2002

(54) HERMETICALLY SEALED CELL

(75) Inventors: Akiyoshi Takada, Shiga-ken (JP);
Kinji Saijo, Yamaguchi-ken (JP);
Kazuo Yoshida, Yamaguchi-ken (JP);
Nobuyuki Yoshimoto, Yamaguchi-ken
(JP); Yoshihiko Isobe, Yamaguchi-ken
(JP)

(73) Assignees: Toyo Kohan Co., Ltd., Tokyo (JP);
**Fukuda Metal Foil & Powder Co.,
Ltd.**, Kyoto (JP)

( * ) Notice: Subject to any disclaimer, the term of this patent is extended or adjusted under 35 U.S.C. 154(b) by 0 days.

(21) Appl. No.: 09/403,385

(22) PCT Filed: Apr. 20, 1998

(86) PCT No.: PCT/JP98/01802

§ 371 (c)(1),
(2), (4) Date: Jan. 6, 2000

(87) PCT Pub. No.: WO98/48465

PCT Pub. Date: Oct. 29, 1998

(30) Foreign Application Priority Data

Apr. 21, 1997 (JP) ............................................. 9-116008

(51) Int. Cl.$^7$ .......................... H01M 2/12; H01M 10/52
(52) U.S. Cl. ............................. 429/56; 429/59; 429/62
(58) Field of Search ............................. 429/56, 59, 62

(56) References Cited

U.S. PATENT DOCUMENTS

| | | | |
|---|---|---|---|
| 3,219,488 A | * 11/1965 | Southworth | |
| 5,427,875 A | * 6/1995 | Yamamoto et al. | 429/223 |
| 5,631,100 A | * 5/1997 | Yoshino et al. | 429/62 |
| 5,741,606 A | * 4/1998 | Mayer et al. | 429/53 |
| 5,821,008 A | * 10/1998 | Harada et al. | 429/56 |

FOREIGN PATENT DOCUMENTS

| | | |
|---|---|---|
| JP | 02-284350 | 11/1990 |
| JP | 04-349347 | 12/1992 |
| JP | 05-314959 | 11/1993 |
| JP | 07-105933 | 4/1995 |
| JP | 07-211300 | 8/1995 |
| JP | 07-254402 | 10/1995 |

* cited by examiner

Primary Examiner—Carol Chaney
Assistant Examiner—Tracy Dove
(74) Attorney, Agent, or Firm—Browdy and Neimark

(57) ABSTRACT

The object of the present invention is to provide a closed battery capable of rapidly releasing the internal pressure thereof and at the same time disconnecting the current to effectively prevent a rise in temperature and explosion so that it may assure the safety and reliability of the battery, when, the internal pressure is elevated due to short circuit, overcharge, reverse charge, or the like in such a completely closed battery.

A closed battery of the present invention is provided with a closing member serving as a valve chip, which is composed of a metal substrate 1 in which a valve element 5 is provided and defined by a break line 3, and a metal foil 2 adhered to the inner surface of the metal substrate 1. When the internal pressure of the battery is elevated, the valve element 5 is raised up from the metal substrate from the bending fulcrum portion 4 so as to permit a opening valve 7 to be formed, so that the metal foil 2 is allowed to burst accurately at a prescribed pressure, especially at a low pressure, so as to discharge the internal gas of the battery. Also, with a lead wire 6 attached to the metal foil 2, the burst can break the current so that the battery is prevented from exploding.

1 Claim, 2 Drawing Sheets

HERMETICALLY SEALED CELL

CROSS REFERENCE TO RELATED APPLICATION

The present application is the national stage under 35 U.S.C. 371 of PCT/JP98/01802, filed Apr. 20, 1998.

FIELD OF THE INVENTION

The present invention relates to a closed battery capable of bursting at a prescribed pressure, especially at a low pressure, to rapidly release the internal pressure and at the same time to break a current, when the battery temperature or the battery internal pressure is elevated.

RELATED ART

Recently, with increasing requirement for electronic devices that are made into much smaller size and lighter weight with high performance, the use of non-aqueous batteries with high energy density has become popular. Batteries which use an alkaline metal such as lithium, sodium, or potassium as an active material for the negative electrode thereof employ a battery container of a completely closed structure, since the alkaline metal easily acts with water.

Such a completely closed battery has the advantage of reasonable storability, however, its high sealability sometimes causes rupture of the battery itself due to the abnormally elevated internal pressure thereof in a case where the battery is exposed to high temperature, or short circuit is formed inside or outside of the battery to cause a large flow of the current, or hydrogen gas is generated in the battery due to water contamination penetrated in the manufacturing process thereof. In such a case, the device that accommodates such a rupturing battery will be broken and moreover, there may be a danger of the broken device and battery harming the user. Accordingly, there is a need for some pressure releasing mechanism before the internal pressure of the battery is increased to such a high extent.

So far, several methods for releasing the internal pressure of a battery have been proposed and some of them have been used in practice. For instance, Japanese laid-open publication HEI 2-304861 discloses a safety valve for a battery, which comprises a valve chest provided at a part of a container of the battery and having a valve through hole to be communicated with the inside of the battery and an outlet to be communicated with the outside, the valve chest comprising a valve member at least whose surface opposed to the valve through hole is made of rubber, and an elastic member for pushing the above mentioned rubber surface of the valve member to the valve through hole. This safety valve holds the sealability of the battery by closing the valve through hole with the rubber-made valve member, and prevents the internal pressure of battery from rising in excess of a prescribed pressure by permitting the valve through hole to be opened when the internal pressure rises to the pressure prescribed for the elastic member.

Such a conventional safety valve has been widely used in Ni—Cd type batteries, however, it has not yet been used in the non-aqueous batteries which employ alkaline metals as the active material for the negative electrode, since even if the elastic member presses the valve member to the valve through hole to thereby close the battery, it is impossible to obtain such a high sealability as required for the non-aqueous batteries.

One of the methods for releasing the internal pressure of a battery which requires high sealability is disclosed in Japanese laid-open publication SHO 63-285859. In this method, a container of the battery is provided with a thinned portion at a part of its wall. This thinned portion is formed by cold rolling a sheet of the container using a press device until the thickness of the rolled portion of the sheet becomes half of the initial thickness thereof. Thus, the battery is provided with good sealability with regard to this thinned wall portion because it is only transformed from a part of the continuous wall of the container.

Another pressure releasing mechanism of this type is disclosed in Japanese laid-open publication HEI-6-215760. This releasing mechanism comprises a valve diaphragm fitted in an open end of the cylindrical container of a battery having a bottom and disposed above the electrode element of the battery, and a lead for current cutoff disposed above the valve diaphragm. In this structure, when the internal pressure of the battery is elevated, the valve diaphragm is expanded to break the lead for current cutoff to cut the current.

According to the method as disclosed in Japanese laid-open publication SHO-63-285859, it is necessary to obtain an extremely thin wall portion of the container so that the thin portion can be ruptured at a relatively low pressure. However, when the wall portion is made too thin, there may be formed fine or minute cracks during press-forming, thus impairing the sealability of the battery container.

Further when metals are processed by cold working, their workability will be inevitably harden. The hardening of the metals does not always take place uniformly, and therefore, there arises a problem that the operating pressure for such pressure releasing mechanism cannot regularly be controlled. There is also proposed a half-etching method for making thinner a part of the wall of a battery container, however, it is extremely difficult to control the remaining thickness of the thinned portion after etching, and also difficult to obtain a good yield. Another problem is that the half-etched portion cannot be free from the formation of pinholes, and therefore, all the products need to be inspected.

On the other hand, according to the method as disclosed in Japanese laid-open publication HEI-6-215760, it is necessary to accurately control the depth of a cut off portion formed in the lead, which causes problems of difficulty for cut off forming and unstable cut off of the current at a prescribed pressure. Another problem is that the current is not reliably cut off at a prescribed pressure.

SUMMARY OF THE INVENTION

With the view to solving the conventional drawbacks as mentioned above, it is the object of the present invention to provide a closed battery incorporating a valve chip which can stably and accurately burst at a prescribed pressure, especially at a low pressure, so as to rapidly release the internal pressure thereof and can be manufactured easily.

In order to solve the above-mentioned problems, the present invention provides a closed battery which comprises an electrode element consisting of a positive electrode, a negative electrode, and a separator; an electrolyte; a battery container accommodating said electrode element together with said electrolyte; and a closing member fitted in the inner periphery of an open end portion of said battery container to close the open end portion of the battery container, wherein said closing member consists of a metal substrate, a valve element which is provided in said metal substrate and defined by a break line so as to serve as a releasing chip such that when the internal pressure of the battery is elevated, the valve element is bent from a bending fulcrum so as to provide the metal substrate with an opening portion for releasing the internal pressure, and a metal foil which is adhered to the inner surface of the metal substrate.

According to the present invention, when the internal pressure of a battery is elevated due to short circuit, overcharge, reverse charge or the like, a valve chip, consisting of a metal substrate in which a valve element is provided for releasing the internal pressure of the battery and a metal foil which has a uniform and accurate thickness and is laid over the metal substrate so as to close a through hole which is usually closed with the valve element, operate to deform itself and push and raise the valve element up, and when the internal pressure reaches a prescribed pressure, the metal foil stably and accurately burst to cut the electric connection and at the same time discharge the internal gas within the battery so that an abrupt rising of the internal temperature or explosion of the battery can previously be prevented.

DETAILED DESCRIPTION OF THE INVENTION

The present invention is now explained in conjunction with preferred embodiments and examples referring to the drawings.

FIG. 1 is a vertical section view showing an upper part of a completely closed battery of the present invention. FIG. 2 is a plane view showing a valve chip of the closed battery of the present invention. FIG. 3 is a vertical section view showing the above mentioned valve chip. FIG. 4 is an explanatory view showing an operating manner of the valve chip in case of abnormality. FIG. 5 and FIG. 6 are plane views showing other embodiments of the valve chip.

In FIG. 1, a cylindrical battery container 30 having a bottom, which serves as a negative electrode terminal, accommodates an electrode element which is isolated from the outside 32 together with an electrolyte. The electrode element 32 is composed of a coiled laminate which comprises a positive electrode 32a, a separator 32b, and a negative electrode 32c disposed opposite to the positive electrode 32a via the separator 32b.

A closing cap 33, having through holes 0 and 0, which serves as a rupture-preventing mechanism and at the same time as a positive electrode terminal is fitted by calking in the upper open end portion of the container 30 via an insulating gasket 34. Above the electrode element 32, a saucer-like inner cap 37 is disposed and a gas release hole 35 of a large diameter is provided at the center portion of the inner cap 37.

Between the inner cap 37 and the closing cap 33, a valve chip V which forms a closing member for enclosing the electrode element and others is provided. A periphery 36 of the valve chip V is in contact with a periphery 33a of the closing cap 33. These peripheries 36 and 33a are fixed by calking in a circumference 37a of the inner cap 37 via an insulating gasket 40.

A lead wire 6 is attached, by an appropriate means, to an inner surface of the valve chip V serving as the closing member for closing the upper open end portion of the battery. The lead wire 6 extends to the positive electrode 32a of the electrode element 32.

As shown in FIG. 2, the valve chip V is a substantially circular in a plane view, and is composed of a metal substrate 1 having a circular form and a metal foil 2 adhered to the inner surface of the metal substrate 1. As a material of the metal substrate 1, any one selected from the group including a steel sheet, stainless steel sheet, copper sheet, and aluminum sheet may be used. As a material of the metal foil 2, any one selected from the group including a steel foil, stainless steel foil, copper foil, aluminum foil, nickel foil, and nickel-iron alloy foil may-be used.

A substantially circular break line 3 is formed in the metal substrate 1 such that the break line entirely penetrates through the metal substrate 1 in its thickness direction, though the above mentioned circular line partly leaves a non-break line portion which forms a bending fulcrum portion 4. The inner portion defined by the break line 3 is formed as a valve element 5 which is to operate as a pressure releasing chip for releasing the internal pressure of the battery when the internal pressure is elevated. When the valve element 5 is raised up from the bending fulcrum portion 4, a valves opening portion 7 will be formed so as to release the internal pressure of the battery. (See FIG. 4.) The lead wire 6 is attached to the metal foil 2 by brazing, for instance.

Next, an operating manner of the valve chip in case of abnormality is explained. Once the internal pressure of the battery is elevated, the valve element 5 is raised up, as shown in FIG. 4, from the bending fulcrum portion 4 while breaking the metal foil 2 to thereby form the valve opening portion 7 so that the internal pressure is released outside. The gas having increased pressure passes through the valve opening portion 7 and is discharged from the through hole 0 of the closing cap 33.

In this case, since the valve element 5 is raised up from the bending fulcrum portion 4, the lead wire 6 is disconnected as shown in FIG. 4, or the brazed portion of the lead wire 6 to the metal foil 2 is detached to thereby cut the electric connection.

Incidentally, the form of the valve element is not necessarily limited to the substantially circular form as shown in FIG. 2, but the one as denoted by 10 in FIG. 5, which is provided with an arm portion 4a at the bending fulcrum portion, or the one as denoted by 11 in FIG. 6, whose form is tongue-like.

According to the completely closed battery of the present invention, when the internal pressure of the battery is elevated due to some abnormality such assort circuit, overcharge, or reverse charge, the metal foil 2 bursts at a prescribed pressure stably and accurately, especially at a low pressure, to push up the circular valve element 5 from the bending fulcrum portion 4 formed on the flexible metal substrate, wherein the circular valve element 5 is provided in the flexible metal substrate 1 and defined by the break line 3 penetrating through the entire thickness of the metal substrate 1. As a result, the lead wire 6 is cut off to thereby disconnect the electric connection. As illustrated in FIG. 4 for explaining the operating manner of the valve chip in the cross section view, when the valve chip operates, it permits the valve opening portion 7 to be formed to thereby release the internal gas of the battery. Thus, the battery can previously be prevented from the abrupt rising of the internal temperature or an explosion thereof.

The operating pressure for the valve chip can be controlled within a stable pressure range by selecting the material composition of the valve chip and adjusting the length of the bending fulcrum portion 4 because metal foil 1 can be manufactured with the highest accuracy of its thickness in micron order.

As mentioned above, according to the present invention, when the internal pressure of a battery is elevated due to short circuit, overcharge, reverse charge, or the like, and, it reaches a prescribed pressure, the valve chip can operate to permit the metal foil to burst stably and accurately even at a low pressure so as to release the internal gas of the battery. Thus, the battery can previously be prevented from the abrupt rising of the temperature or explosion thereof.

EXPLANATION OF REFERENCE CHARACTERS

Figure 1:
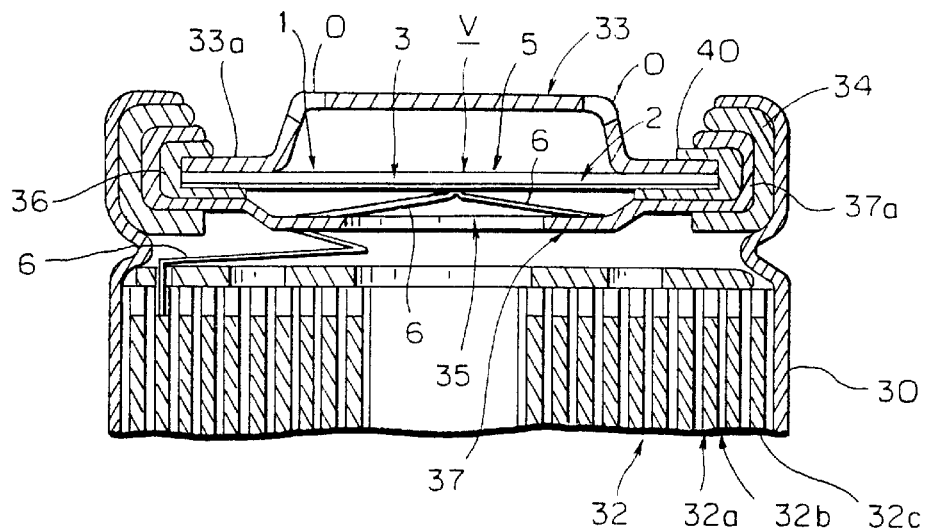
FIG. 1 is a vertical section view showing an upper part of the completely closed battery according to the present invention.
Figure 2:
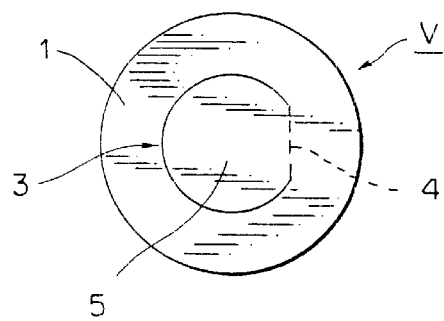
FIG. 2 is a plane view showing the valve chip according to the present invention.
Figure 3:
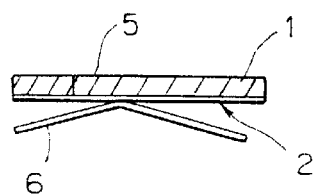
FIG. 3 is a vertical section view showing the valve chip according to the present invention.
Figure 4:
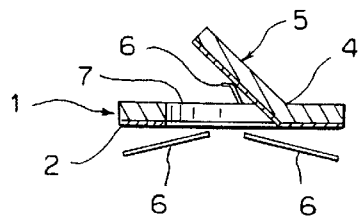
FIG. 4 is an explanatory view showing the operating manner of the valve chip in case of abnormality.
Figure 5:
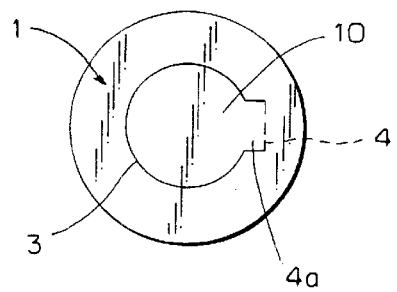
FIG. 5 is a plane view showing another embodiment of the valve chip according to the present invention.
Figure 6:
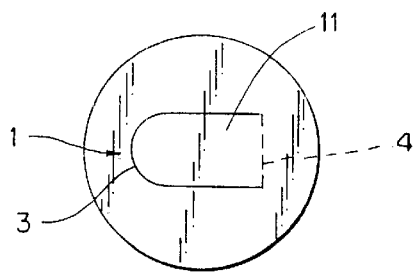
FIG. 6 is a plane view showing still another embodiment of the valve chip according to the present invention.

1: flexible metal substrate
2: metal foil
3: break line
4: bending fulcrum portion
5: circular valve element
6: lead wire
7: valve opening portion

What is claimed is:

1. A closed battery system comprising:

an electrode element consisting of a positive electrode, a negative electrode, and a separator;

an electrolyte;

a battery container accommodating said electrode element together with said electrolyte; and a closing member fitted in the inner periphery of an open end portion of said battery container to close the open end portion of the battery container;

wherein said closing member consists of a metal substrate, a valve element which has a substantially circular form and is provided in said metal substrate and defined by a break line so as to serve as a releasing chip such that when the internal pressure of the battery is elevated, the valve element is bent from a bending fulcrum provided with an arm portion so as to provide the metal substrate with an opening portion for releasing the internal pressure, and a metal foil which is adhered to the inner surface of said metal substrate.

* * * * *